United States Patent
Kim et al.

(10) Patent No.: US 8,139,691 B2
(45) Date of Patent: Mar. 20, 2012

(54) APPARATUS AND METHOD FOR SELECTING CORRELATION SCHEME BASED ON CARRIER FREQUENCY ERROR

(75) Inventors: Pansoo Kim, Daejon (KR); Dae-Ig Chang, Daejon (KR); In-Ki Lee, Busan (KR); Sangtae Kim, Gyeonggi-do (KR); Wonjin Sung, Gyeonggi-do (KR)

(73) Assignees: Electronics and Telecommunications Research Institute, Daejon (KR); Industry-University Cooperation Foundation Sogang University, Seoul (KR)

( * ) Notice: Subject to any disclaimer, the term of this patent is extended or adjusted under 35 U.S.C. 154(b) by 849 days.

(21) Appl. No.: 12/182,447

(22) Filed: Jul. 30, 2008

(65) Prior Publication Data

US 2009/0154609 A1    Jun. 18, 2009

(30) Foreign Application Priority Data

Dec. 13, 2007  (KR) .................. 10-2007-0130166
Mar. 20, 2008  (KR) .................. 10-2008-0025903

(51) Int. Cl.
*H03D 1/00*    (2006.01)

(52) U.S. Cl. ........ 375/343; 375/142; 375/150; 375/316; 375/324; 375/325; 375/340; 375/362

(58) Field of Classification Search .......... 375/316, 375/340, 343, 150, 324–325, 330, 362; 708/422; 455/161.2
See application file for complete search history.

(56) References Cited

U.S. PATENT DOCUMENTS

| 7,016,661 B2 * | 3/2006 | Gorday et al. ............. 455/309 |
| 2008/0170560 A1 * | 7/2008 | Im et al. .................. 370/350 |

FOREIGN PATENT DOCUMENTS

| KR | 2007-0027060 A | 3/2007 |
| KR | 100717878 | 5/2007 |

OTHER PUBLICATIONS

Corazza et al.; Frame acquisition for continuous and discontinuous transmission in the forward link of satellite systems; International Journal of Satellite Communications and Networking, vol. 24, Jan. 2006; pp. 185-201.

* cited by examiner

*Primary Examiner* — Chieh M Fan
*Assistant Examiner* — Sophia Vlahos
(74) *Attorney, Agent, or Firm* — Rabin & Berdo, P.C.

(57) ABSTRACT

Provided is a correlation scheme selecting apparatus and method that can acquire initial synchronization efficiently by calculating frequency error criterion threshold between correlation schemes and selecting a correlation scheme for each region when a correlation value is calculated for initial sync in a communication system with carrier frequency errors. The method for selecting a correlation scheme based on a carrier frequency error includes: calculating mis-detection probability values based on a normalized frequency offset for each correlation scheme; determining as a frequency-error criterion threshold a crossing point of graphs of the calculated mis-detection probability values for each correlation scheme; and selecting a correlation scheme based on the determined frequency-error criterion threshold.

10 Claims, 6 Drawing Sheets

APPARATUS AND METHOD FOR SELECTING CORRELATION SCHEME BASED ON CARRIER FREQUENCY ERROR

BACKGROUND OF THE INVENTION

1. Field of the Invention

The present invention relates to an apparatus and method for selecting a correlation scheme based on a carrier frequency error; and, more particularly, to a correlation scheme selecting apparatus and method which acquires initial synchronization efficiently by calculating frequency-error criterion threshold between correlation schemes and selecting a correlation scheme for a corresponding region.

This work was supported by the IT R&D program of MIC/IITA [2007-S-008-01, "Development of 21 GHz Band Satellite Broadcasting Transmission Technology"].

2. Description of Related Art

Recently, as the distinction between broadcasting and communications becomes vague and bi-directional services become available, there are demands for broadband services and reliable transmission services. Thus, satellite communication systems employ Adaptive Coding and Modulation (ACM) to acquire a high transmission capacity with a given bandwidth and signal power.

Particularly, Digital Video Broadcasting satellite Second Generation (DVB-S2), which is the standard of European Digital Video Satellite Broadcasts, uses the ACM scheme that determines an optimum modulation scheme and an optimum coding rate according to a channel condition to thereby maximize the transmission efficiency.

Due to the use of the ACM scheme, each receiver of a satellite communication system which provides Ka-band services ranging from 18 to 31 GHz can secure a transmission capacity up to 100 to 200% by adaptively controlling a data link according to propagation conditions. However, it requires a process for detecting a varying structure of transmission frame as well as frame sync in order to recover a carrier.

Meanwhile, the DVB-S2 system performs correlation calculation in order to acquire initial sync under an environment where carrier frequency errors exist. The frequency errors existing between a transmitter and a receiver degrade the performance of a correlator.

Accordingly, a differential correlation between a received signal and a Start of Frame (SoF) which is a preamble obtained during a previous frame sync process is used to minimize the influence caused by the frequency error.

However, under the environment where there is no frequency error or frequency errors are present below a certain level, a case employing the differential correlation causes severer performance degradation than a case employing coherent correlation. Therefore, it is more advantageous to adaptively select and use either the coherent correlation or the differential correlation scheme according to a change in the level of the frequency error, than to use each one of the correlation schemes.

SUMMARY OF THE INVENTION

An embodiment of the present invention is directed to providing a method for adaptively selecting a correlation scheme based on a carrier frequency error.

Another embodiment of the present invention is directed to providing a correlation scheme selecting apparatus and method that can acquire initial synchronization efficiently by calculating frequency error criterion threshold between correlation schemes and selecting a correlation scheme for each region when a correlation value is calculated for initial sync in a communication system with carrier frequency errors.

In accordance with an aspect of the present invention, there is provided a method for selecting a correlation scheme based on a carrier frequency error, comprising: calculating mis-detection probability values based on a normalized frequency offset for each correlation scheme; determining as a frequency-error criterion threshold a crossing point of graphs of the calculated mis-detection probability values for each correlation scheme; and selecting a correlation scheme based on the determined frequency-error criterion threshold.

Further, in accordance with another aspect of the present invention, there is provided an apparatus for selecting a correlation scheme based on a carrier frequency error, comprising: a mis-detection probability value calculation means for calculating mis-detection probability values based on a normalized frequency offset for each correlation scheme; a frequency-error criterion threshold means for determining as a frequency-error criterion threshold a crossing point of graphs of the calculated mis-detection probability values of the mis-detection probability value calculation means for each correlation scheme; and a correlation scheme selection means for selecting a correlation scheme based on the determined frequency-error criterion threshold of the frequency-error criterion threshold determination means.

Further, under an environment where there are frequency errors as to carriers of tens of GHz, the present invention provides an optimal frequency-error criterion threshold to be used for adaptively selecting the coherent correlation scheme, the differential correlation scheme, or a modified differential correlation scheme according to the extent of the frequency error.

Furthermore, the present invention is applied to a correlation value calculation process of a frame sync and structure detection algorithm which uses a hard-decision on a correlation value to store only a position decision index and thereby reduce storage space and a frame sync and structure detection algorithm which uses a soft-decision to obtain a maximum value of sums of correlation values and thereby enhance sync performance, thereby improving initial sync performance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Also, when it is considered that detailed description may obscure a point of the present invention, the description will not be provided herein. Hereinafter, specific embodiments of the present invention will be described in detail with reference to the accompanying drawings.

Although a satellite communications system (DVB-S2) is taken as an example of a wireless communication system to which the present invention is applied in an embodiment of the present invention, but the present invention is not limited thereto.

Also, since the technologies of a coherent correlation scheme, a differential correlation scheme, and a weighted differential correlation scheme mentioned in the present invention are widely known to those skilled in the art, they will not be described in detail herein.

Figure 1:
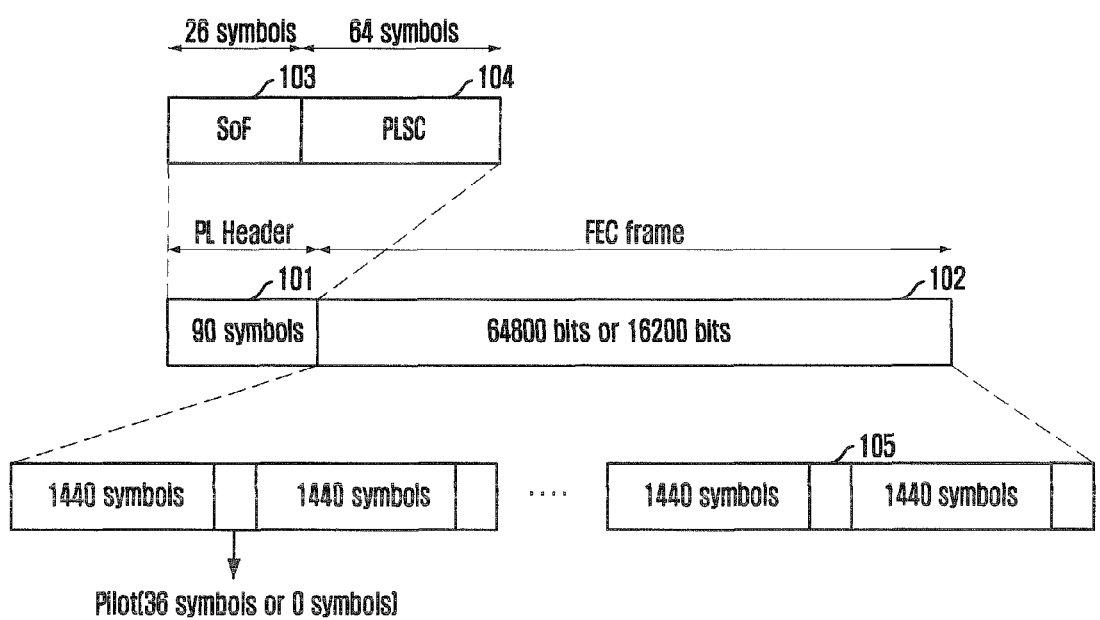
FIG. 1 shows a transmission frame structure of a DVB-S2 physical layer which is used in the present invention.

FIG. 1 is a view showing a transmission frame structure of the DVB-S2 physical layer which is used in the present invention.

As shown in FIG. 1, the transmission frame of a DVB-S2 physical layer used in the present invention includes a Physical Layer (PL) header 101 having 90 symbols and a Forward Error correction (FEC) frame 102 having 64800 bits or 16200 bits.

Herein, the PL header 101 includes a Start of Frame (SoF) 103 having 26 symbols and a Physical Layer Signaling Code (PLSC) 104 having 64 symbols. The PLSC 104 is a codeword including a modulation scheme, a coding rate, and information on whether or not there is a pilot symbol 105 inserted into the FEC frame.

Table 1 below shows modulation schemes, e.g., Quadrature Phase Shift Keying (QPSK), 8PSK, 16APSK or 32APSK, data lengths, e.g., 64800 or 16200 bits/frame, and 16 variable frame structures based on whether the pilot symbols are inserted or not.

TABLE 1

| Structure Index (n) | Modulation scheme | Number of bits per FEC frame | Number of pilot symbols per frame | Number of entire symbols per frame ($L_n$) |
|---|---|---|---|---|
|   | QPSK    | 64800 | 792 | 33282 |
| 1 | QPSK    | 64800 | 0   | 32490 |
| 2 | QPSK    | 16200 | 180 | 8370  |
| 3 | QPSK    | 16200 | 0   | 8190  |
| 4 | 8PSK    | 64800 | 504 | 22194 |
| 5 | 8PSK    | 64800 | 0   | 21690 |
| 6 | 8PSK    | 16200 | 108 | 5598  |
| 7 | 8PSK    | 16200 | 0   | 5490  |
| 8 | 16APSK  | 64800 | 396 | 16686 |
| 9 | 16APSK  | 64800 | 0   | 16290 |
| 10 | 16APSK | 16200 | 72  | 4212  |
| 11 | 16APSK | 16200 | 0   | 4140  |
| 12 | 32APSK | 64800 | 288 | 13338 |
| 13 | 32APSK | 64800 | 0   | 13050 |
| 14 | 32APSK | 16200 | 72  | 3402  |
| 15 | 32APSK | 16200 | 0   | 3330  |

Herein n denotes an index of a transmission frame structure, and the number of entire symbols ($L_n$, n=1~15) per frame varies and is transmitted according to each structure index.

Figure 2:
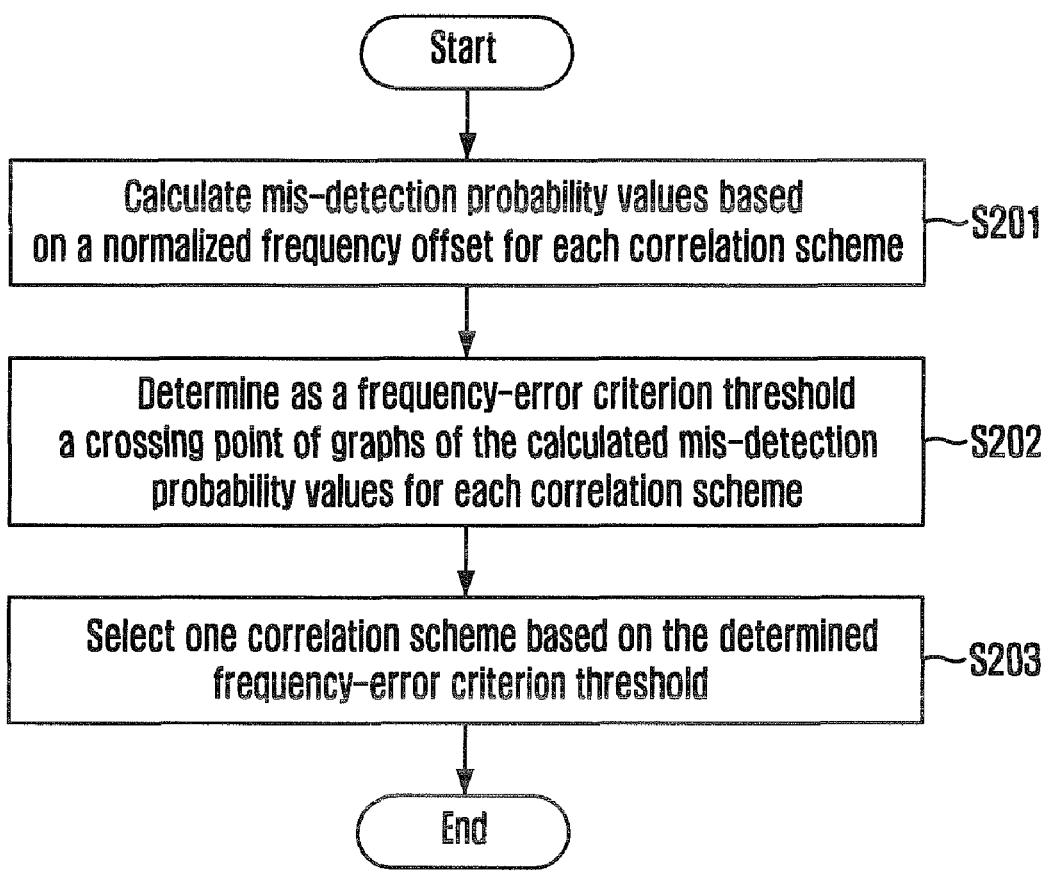
FIG. 2 is a flowchart illustrating a method for selecting a correlation scheme based on a carrier frequency error in accordance with an embodiment of the present invention.

FIG. 2 is a flowchart illustrating a method for selecting a correlation scheme based on a carrier frequency error in accordance with an embodiment of the present invention.

First, in step S201, mis-detection probability values are calculated based on a normalized frequency offset for each correlation scheme.

In other words, a mathematical equation for false alarm rate and a mathematical equation for mis-detection probability are obtained for each correlation scheme, and a threshold value is calculated by fixing the obtained false alarm rate equation to a predetermined value for each correlation scheme. Then, the calculated threshold value is applied to the mis-detection probability equation for a corresponding correlation scheme to thereby calculate a mis-detection probability value.

In step S202, a crossing point of graphs of mis-detection probability values for calculated correlation schemes is decided as a frequency-error criterion threshold.

In step S203, a correlation scheme is selected based on the determined frequency-error criterion threshold.

Hereinafter, a process for calculating a frequency-error criterion threshold will be described in detail.

First, M SoF symbols are defined as $S_k$(k=1, ..., M), and consecutive M symbols of transmitted data symbols are defined as $d_k$ (k=1, ..., M).

Herein, when $r_k$ denotes received symbols obtained by adding $n_k$, $n_k$ being an Additive White Gaussian Noise (AWGN) sample having a variance ($\sigma_n^2$), to $s_k$ or $d_k$, M symbols currently received can be defined as $H_1$ ($r_k=s_k+n_k$, k=1, ..., M).

Also, $H_0$ ($r_k=d_k+n_k$, k=1, ..., M) can be defined as a case where received M symbols correspond to common data symbols, including a case where SoF symbols partially exist.

In general, a receiver uses a correlation structure in order to discriminate between $H_0$ and $H_1$.

In short, there are various types of algorithms for correlation calculation, but the most basic form is a coherent correlation scheme between a received symbol sequence and a stored SoF symbol sequence, which can be expressed as the following Equation 1.

$$C_{i,coh} = \sum_{k=0}^{M-1} r_{k+i} s_k^* \qquad \text{Eq. 1}$$

where i denotes an index of the received symbols.

Since the coherent correlation scheme causes performance degradation in a case where there is a frequency error, the differential correlation scheme is more efficient, which uses phase differential information between adjacent symbols.

Equation 2 below expresses one type of differential correlation schemes.

$$c_{i,diff1} = \sum_{k=1}^{M-1} \tilde{r}_{k,k+i}^* \times \tilde{r}_{k-1,k+i-1} \qquad \text{Eq. 2}$$

$$\tilde{r}_{n,i} = r_i \times s_n^*$$

Also, as a modified form of Equation 2, a weighted differential correlation scheme utilizing differential information to which a weight is applied based on a distance between adjacent symbols is represented as the following Equation 3.

$$c_{i,diff2} = 4\left|\sum_{k=1}^{M-1} \tilde{r}^*_{k,k+i} \times \tilde{r}_{k-1,k+i-1}\right| + 2\left|\sum_{k=2}^{M-1} \tilde{r}^*_{k,k+i} \times \tilde{r}_{k-2,k+i-2}\right| \quad \text{Eq. 3}$$

$$\tilde{r}_{n,i} = r_i \times s^*_n$$

Next, the probability for a threshold value ($\Gamma$) to be $|c_i|^2 > \Gamma$ under $H_0$ is defined as False Alarm Rate(hereinafter, referred to as "FAR"), and the probability for the threshold value ($\Gamma$) to be $|c_i|^2 > \Gamma$ under $H_1$ is defined as mis-detection probability (hereinafter, referred to as "MDP").

In here, if received symbols are Start of Frame symbols, the threshold value ($\Gamma$) refers to a correlation value to be involved in the mis-detection probability, or, if the received symbols are common data symbols, the threshold value ($\Gamma$) refers to a correlation value to be involved in the False Alarm Rate.

In here, the probability distribution of $|c_{i,coh}|^2$ being a correlation value of Equation 1 has a chi-square distribution.

Accordingly, there can be obtained respective probability Density Functions (hereinafter, referred to as "PDF") for the case of $H_0$ (when asynchronous) and the case of $H_1$ (when synchronous).

That is, when the square of a correlation magnitude for symbols when asynchronous is defined as $X = |c_{i,coh}|^2$, $X_i$ follows a distribution of the central chi-square with 2 degree of freedom of an average=0 and variance $\sigma^2 = M/2 + M\sigma_n^2$, and, at this time, the PDF is defined as Equation 4 as below:

$$f_X(x) = \frac{1}{2\sigma^2}\exp\left(\frac{x}{2\sigma^2}\right) \quad \text{Eq. 4}$$

As well, when the square of a correlation magnitude for symbols when synchronous is defined as $Y = |c_{i,coh}|^2$, $Y_i$ follows a non-central chi-square distribution with 2 degree of freedom, and, at this time, the form of PDF is expressed as Equation 5 below:

$$f_Y(y) = \frac{1}{2\tilde{\sigma}^2}\exp\left(-\frac{s^2}{2\tilde{\sigma}^2}\right)I_0\left(\sqrt{y}\,\frac{s}{\tilde{\sigma}}\right) \quad \text{Eq. 5}$$

where variance ($\tilde{\sigma}^2$) satisfies $\tilde{\sigma}^2 = M\sigma_n^2$, and a non-centrality parameter ($s^2$) satisfies $$s^2 = \left|\sum_{i=0}^{M-1}\exp\left(\frac{j2\pi\Delta f i}{BW}\right)\right|^2.$$

Also, $\Delta f$ denotes a frequency error, BW a bandwidth, and Iz(•) a z-t h order modified Bessel function of the first kind.

The FAR and the MDP may be expressed as the following Equations 6 and 7, respectively, based on Equations 4 and 5.

$$FAR: P_F(\Gamma) = \int_\Gamma^\infty f_X(x)dx = \exp\left(-\frac{\Gamma}{2\sigma_X^2}\right) \quad \text{Eq. 6}$$

$$MDP: P_M(\Gamma) = \int_0^\Gamma f_Y(y)dy = 1 - Q_1\left(\frac{s}{\tilde{\sigma}_n}, \frac{\sqrt{\Gamma}}{\tilde{\sigma}_n}\right) \quad \text{Eq. 7}$$

Figure 3:
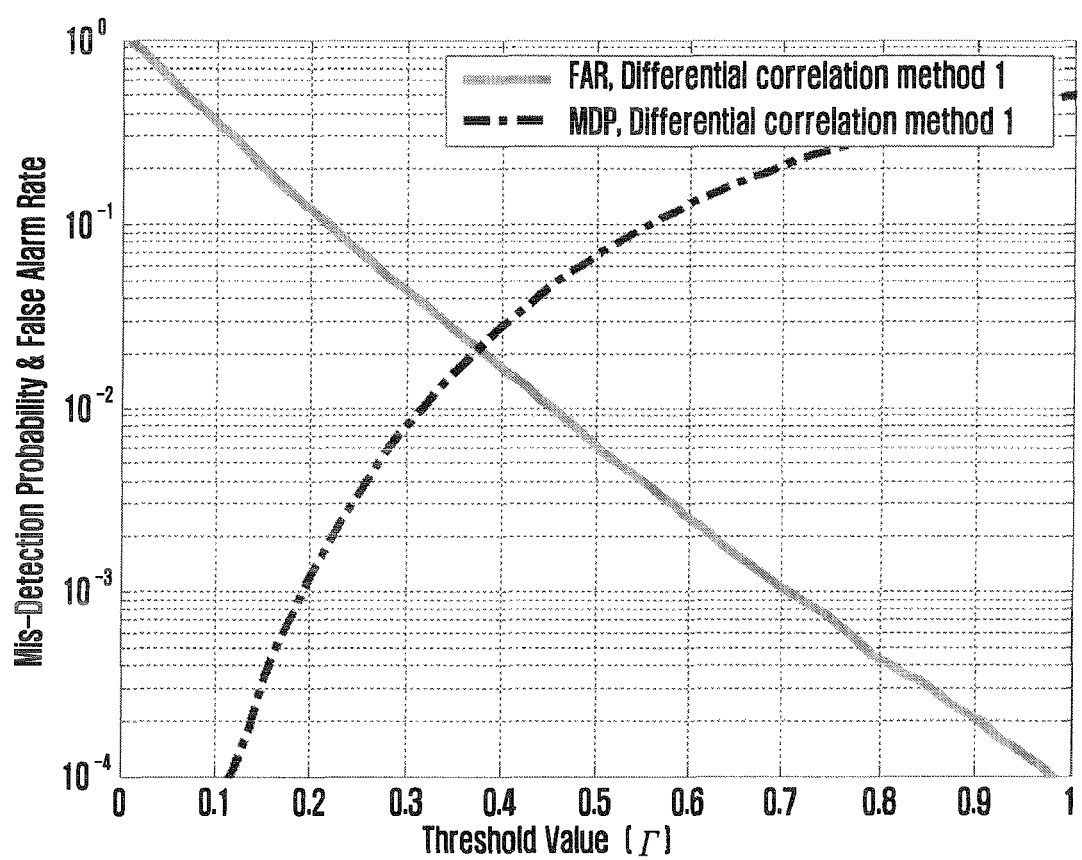
FIG. 3 is a graph showing false alarm rate and mis-detection probability for each threshold value in a differential correlation scheme in accordance with an embodiment of the present invention.
Figure 4:
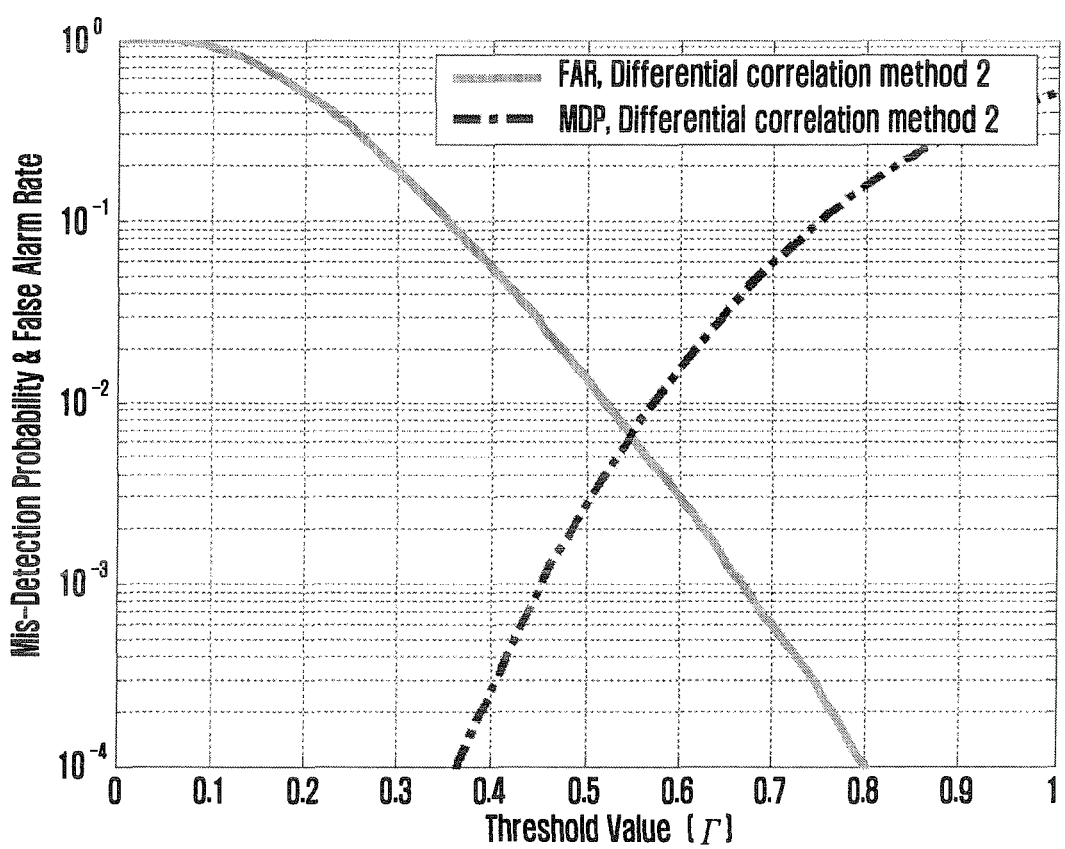
FIG. 4 is a graph showing false alarm rate and mis-detection probability for each threshold value for a weighted differential correlation scheme in accordance with an embodiment of the present invention.

Meanwhile, probability distributions for differential correlation values $|c_{i,diff1}|^2$ and $|c_{i,diff2}|^2$ of Equations 2 and 3 are determined through simulations, respectively, and the FAR and MDP of which are shown in FIGS. 3 and 4, respectively, according to variation of the threshold value ($\Gamma$) under an environment of SNR 3 dB.

As shown in FIG. 3, the differential correlation scheme is denoted as 'differential correlation method 1', and, as shown in FIG. 4, the weighted differential correlation scheme is denoted as 'differential correlation method 2'.

Accordingly, under the environment where there is a frequency error, the present invention presents a frequency-error criterion threshold in order to adaptively use the coherent, the differential, or the weighted differential correlation scheme based on the extent of the frequency error.

To do so, first, the FAR of the coherent correlation scheme as in Equation 6 and the experimentally obtained FARs of the differential correlation scheme and weighted differential correlation scheme are fixed to $10^{-2}$, and then a threshold value ($\Gamma$) satisfying the condition that FAR is $10^{-2}$ is calculated.

Next, the calculated threshold value ($\Gamma$) is used to obtain an MDP value. Accordingly, by defining as a performance indicator the MDPs of the differential and coherent correlation schemes, the performance of the respective schemes can be compared.

Figure 5:
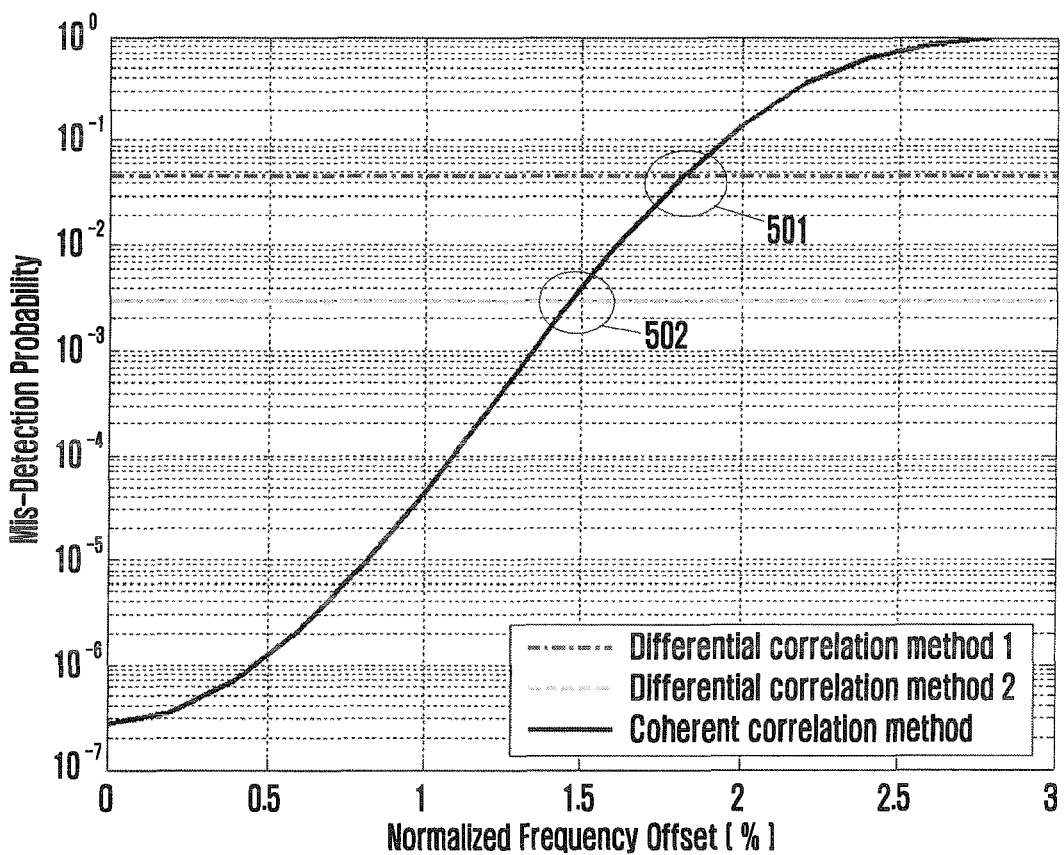
FIG. 5 is a graph showing frequency-error criterion threshold in accordance with an embodiment of the present invention.

FIG. 5 is a graph showing frequency-error criterion threshold in accordance with an embodiment of the present invention. The drawing shows a result of comparing the MDPs of the coherent, differential and weighted differential correlation schemes based on a frequency offset normalized to a 25 MHz bandwidth when the FAR is fixed to $10^{-2}$ at the SNR of 3 dB.

As shown in FIG. 5, the coherent correlation scheme is denoted as 'coherent correlation method', the differential correlation scheme 'differential correlation method 1', and the weighted differential correlation scheme 'differential correlation method 2'.

Herein, the threshold value ($\Gamma$) of the coherent correlation scheme is 0.26 at the SNR of 3 dB, whereas that the threshold value ($\Gamma$) of the differential correlation scheme is 0.45. The threshold value ($\Gamma$) of the weighted differential correlation scheme is 0.52.

Each MDP can be calculated by using the threshold value ($\Gamma$) for each scheme. As shown in FIG. 4, about 1.80% of frequency errors occurring at the SNR of 3 dB are criterion thresholds 501 of the coherent and differential correlation schemes. About 1.45% of the frequency errors occurring at the SNR of 3 dB are criterion thresholds 502 of the coherent and weighted differential correlation schemes.

Accordingly, when a frequency error is below about 1.78% at the SNR of 3 dB with a small error margin taken into consideration and the coherent correlation scheme is used rather than the differential correlation scheme, performance degradation caused by the different correlation scheme can be overcome. When the frequency error is over 1.78% and the differential correlation scheme is used, performance degradation due to the coherent correlation scheme can be overcome.

Likewise, the coherent or the weighted differential correlation scheme can be adaptively selected based on a frequency error of about 1.47%.

In the meantime, the method for selecting a correlation scheme based on a carrier frequency error, suggested in the present invention, can be applied to the correlation value calculation process of a frame synchronization and structure detection algorithm to enhance a frame detection performance.

To be specific, the method of the present invention may be applied to a frame synchronization and structure detection in a satellite broadcasting system to enhance an initial synchronization acquisition performance.

For example, in a channel environment of a satellite broadcasting system having a low signal-to-noise ratio and a high frequency error, the present invention can be applied to computing correlation values of a frame synchronization and structure detection method in a satellite broadcasting system for acquiring not only frame synchronization position but also a detection estimation value of a transmission frame structure and overcoming distortions of correlation analysis values caused by a frequency error by calculating a sum of differential correlation values for location of SoF and selecting a maximum value in consideration of a variable frame length. Herein, SOF is a synchronization word indicating the start of a frame.

For another example, the present invention can be also applied to computing correlation values in a frame synchronization and structure detection method in a satellite broadcasting system for detecting a frame synchronization and structure with a low complexity and a small memory capacity by calculating differential correlation values of received symbols to compute an index sequence of the symbols exceeding a threshold value, obtaining the number of symbols per frame for each frame structure, and detecting a frame synchronization and structure based on the number of points where the computed index sequences are matched at an estimated SOF location corresponding to the number of entire frames.

Figure 6:
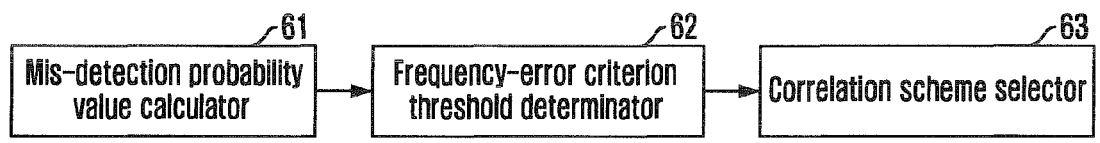
FIG. 6 is a block diagram showing an apparatus for selecting a correlation scheme based on a carrier frequency error in accordance with an embodiment of the present invention.

FIG. 6 is a block diagram showing an apparatus for selecting a correlation scheme based on a carrier frequency error in accordance with an embodiment of the present invention. Since the constituent elements are the same as described above, only their connections and operations will be described in brief.

Referring to FIG. 6, the apparatus for selecting a correlation scheme includes a mis-detection probability value calculator 61 for calculating mis-detection probability values based on a normalized frequency offset for each correlation scheme, a frequency-error criterion threshold determiner 62 for determining as a frequency-error criterion threshold a crossing point of graphs of the mis-detection probability values for each correlation scheme, which is calculated in the mis-detection probability value calculator 61, and a correlation scheme selector 63 for selecting a correlation scheme based on the frequency-error criterion threshold determined by the frequency-error criterion threshold determiner 62.

Meanwhile, the method of the present invention as described above can be coded in a computer program. The codes and code segments constituting the program can be easily inferred by computer programmers in the art. The coded program may be stored in a computer-readable recording medium (which is a data storage) and read and executed by a computer, thereby implementing the method of the present invention. Herein, the recording medium refers to all types of computer-readable recording media.

The present invention as described above make it possible to acquire initial synchronization effectively by calculating frequency-error criterion thresholds between correlation schemes and selecting a correlation scheme for a corresponding region, when correlation values for an initial synchronization acquisition are calculated in a communication system having carrier frequency errors. The present invention can be applied to frame synchronization and structure algorithms.

The present application contains subject matter related to Korean Patent Application Nos. 2007-0130166 and 2008-0025903, filed with the Korean Intellectual Property Office on Dec. 13, 2007, and Mar. 20, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A method for selecting a correlation scheme based on a carrier frequency error between a transmitter and a receiver of a communication system, comprising:
calculating mis-detection probability values based on a normalized frequency offset for each of a plurality of correlation schemes;
determining as a frequency-error criterion threshold a crossing point of graphs of the calculated mis-detection probability values for each of said correlation schemes; and
selecting a correlation scheme to be employed in the receiver from said plurality of correlation schemes based on the determined frequency-error criterion threshold,
wherein said calculating the mis-detection probability values comprises:
computing a False Alarm Rate calculation equation and a mis-detection probability calculation equation for each correlation scheme;
fixing a computed False Alarm Rate for each said correlation scheme to a predetermined value and calculating a threshold value; and
applying the calculated threshold value to the mis-detection probability calculation equation for a corresponding correlation scheme and calculating mis-detection probability values.

2. The method of claim 1, wherein, when received symbols are common data symbols, the calculated threshold value is a correlation value involved in the computed False Alarm Rate.

3. The method of claim 1, wherein, when received symbols are Start-of-Frame symbols, the calculated threshold value is a correlation value involved in the mis-detection probability.

4. The method of claim 1, wherein one of a coherent correlation scheme and a differential correlation scheme is selected in said selecting a correlation scheme.

5. The method of claim 1, wherein one of a coherent correlation scheme and a weighted differential correlation scheme is selected in said selecting a correlation scheme.

6. An apparatus for selecting a correlation scheme based on a carrier frequency error, comprising:
a mis-detection probability value calculator configured to calculate mis-detection probability values based on a normalized frequency offset for each of a plurality of correlation schemes;
a frequency-error criterion threshold determinator configured to determine as a frequency-error criterion threshold a crossing point of graphs of the calculated mis-detection probability values of the mis-detection probability value calculator for each of said correlation schemes; and
a correlation scheme selector configured to select a correlation scheme from said plurality of correlation schemes based on the determined frequency-error criterion threshold of the frequency-error criterion threshold determinator, wherein the mis-detection probability value calculator:

computes a False Alarm Rate calculation equation and a mis-detection probability calculation equation for each correlation scheme, calculates a threshold value by fixing a computed False Alarm Rate for each said correlation scheme to a predetermined value, and calculates mis-detection probability values by applying the calculated threshold value to the mis-detection probability calculation equation for a corresponding correlation scheme.

7. The apparatus of claim 6, wherein, when received symbols are common data symbols, the threshold value is a correlation value involved in the computed False Alarm Rate.

8. The apparatus of claim 6, wherein, when received symbols are Start-of-Frame symbols, the threshold value is a correlation value involved in the mis-detection probability.

9. The apparatus of claim 6, wherein the correlation scheme selector selects one of a coherent correlation scheme and a differential correlation scheme.

10. The apparatus of claim 6, wherein the correlation scheme selector selects one of a coherent correlation scheme and a weighted differential correlation scheme.

* * * * *